United States Patent
Toba et al.

(10) Patent No.: US 12,142,092 B2
(45) Date of Patent: Nov. 12, 2024

(54) DISTRIBUTED SYSTEM AND DATA PROCESSING METHOD

(71) Applicant: HITACHI, LTD., Tokyo (JP)

(72) Inventors: Tadanobu Toba, Tokyo (JP); Kenichi Shimbo, Tokyo (JP); Yutaka Uematsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 297 days.

(21) Appl. No.: 17/709,506

(22) Filed: Mar. 31, 2022

(65) Prior Publication Data

US 2022/0366735 A1    Nov. 17, 2022

(30) Foreign Application Priority Data

May 13, 2021    (JP) ................................. 2021-81641

(51) Int. Cl.
*G07C 5/08*    (2006.01)
*G07C 5/00*    (2006.01)

(52) U.S. Cl.
CPC ........... *G07C 5/0808* (2013.01); *G07C 5/008* (2013.01); *G07C 5/0841* (2013.01)

(58) Field of Classification Search
CPC .... G07C 5/0808; G07C 5/008; G07C 5/0841; G06F 11/0709; G06F 11/0739; G06F 11/0751; G06F 11/0778; G06F 11/079
See application file for complete search history.

(56) References Cited

U.S. PATENT DOCUMENTS

2016/0246659 A1*   8/2016   Komatsu ............. G06F 11/0748
2016/0306691 A1*   10/2016   Aneja ................. G06F 11/0709

FOREIGN PATENT DOCUMENTS

| JP | 2006163520 A | * | 6/2006 |
| JP | 2006-349429 A | | 12/2006 |
| JP | 2011-138251 A | | 7/2011 |
| JP | 2016-152011 A | | 8/2016 |

OTHER PUBLICATIONS

English translation of JP2006163520A Author: Ozaki Yasushi Title: Failure Prediction and Monitoring System Date: Dec. 2, 2004 (Year: 2006).*
Japanese Office Action received in corresponding Japanese Application No. 2021-081641 dated Aug. 6, 2024.

* cited by examiner

*Primary Examiner* — Khoi H Tran
*Assistant Examiner* — Trang Dang
(74) *Attorney, Agent, or Firm* — MATTINGLY & MALUR, PC

(57) ABSTRACT

A distributed system includes an edge device which is at least one of an automatically operable moving body and equipment, and a diagnostic data computer, in which the edge device converts state data representing a state of a component that is a constituent of a replaceable unit forming the edge device, into diagnostic data according to a predetermined diagnostic algorithm, and the diagnostic data computer acquires the diagnostic data from a first edge device, and specifies a second edge device that employs a component related to the component employed in he first edge device.

6 Claims, 7 Drawing Sheets

FIG. 7

FACTOR ANALYSIS RESULT SCREEN FOR OPERATOR

TARGET EDGE DEVICE

| NAME · MODEL : | SEDAN A | MODEL AA-011 |

USER HISTORY :

FACTOR ANALYSIS RESULT

SITE OF ABNORMALITY OCCURRENCE :

OCCURRENCE DATE : 20yy/mm/dd

| [ABNORMAL UNIT a] | OCCURRENCE TIME |
| ⎯ [ABNORMAL BOARD A] | 01:11:1 |
| ⎯ [ABNORMAL BOARD B] | 01:12:7 |

POINT OF ABNORMALITY OCCURRENCE : ADDRESS OR LATITUDE · LONGITUDE, ETC.

ABNORMALITY RESPONSE URGENCY :
- IMMEDIATE REPLACEMENT · REPAIR REQUIRED
- RESPONSE REQUIRED AFTER RETURN
- RESPONSE AT TIME OF REGULAR MAINTENANCE

IN-GROUP DEVICE IN NEED OF RESPONSE :
[1] SEDAN A | MODEL AB-041 | DEGREE OF RELEVANCE: A
[2] SEDAN B | MODEL CD-171 | DEGREE OF RELEVANCE: B

RESPONSE CONTENT : BOARD B REPLACEMENT : ESTIMATED COST: ¥12,000

ABNORMALITY FACTOR : ABNORMALITY OCCURRENCE HISTORY :
- PROCESSOR COMPONENT FAILURE OF UNIT b
- PROCESSOR COMPONENT FAILURE OF UNIT a (20XX.XX.XX)

600

DISTRIBUTED SYSTEM AND DATA PROCESSING METHOD

CROSS-REFERENCE TO RELATED APPLICATION

The present application claims priority from Japanese application JP 2021-81641, filed on May 13, 2021, the contents of which is hereby incorporated by reference into this application.

BACKGROUND OF THE INVENTION

1. Field of the Invention

The present disclosure relates to a distributed system and a data processing method.

2. Description of Related Art

JP-A-2006-349429 describes a failure diagnosis device outside a vehicle, which diagnoses failures occurring in the vehicle, in which, when failure information detected in the vehicle is acquired and a failure is detected in the vehicle, the failure diagnosis device changes a failure occurrence determination criterion for the failure of the same type of another vehicle as the vehicle, so that it is easier to determine the failure based on the same than by the default setting value, and determines whether the failure is unique to the vehicle or can generally occur in the same type of vehicles as the vehicle.

According to the technique described in JP-A-2006-349429, when a failure occurs in a certain vehicle, it can be determined whether or not the same failure may occur in the same type of another vehicle as the vehicle. However, the vehicles to determine the possibility that the same failure may occur are limited to the same type of vehicles as the failed vehicle.

In addition, edge devices, which are represented by vehicles, include a large number of components, and each component is employed not only in the same type of vehicles but also in a wide variety of edge devices. Therefore, when a failure or abnormality occurs in an edge device, and if a specific component is a factor of the failure or abnormality, the edge devices where the failure or abnormality is likely to occur in the future are not limited to the same type of vehicles as the edge device where the failure or abnormality is occurred. Therefore, it is desirable to be able to determine whether or not a failure or abnormality can occur for a wide variety of edge devices that employ the component, and output an alert. However, at present, such a technique is not established.

SUMMARY OF THE INVENTION

The present disclosure has been made in view of the problems described above, and it is an object of the present disclosure to be able to specify another edge device that employs the component that is the factor of an abnormality when the abnormality occurs in a certain edge device.

The present application includes a plurality of means for solving at least a part of the problems described above, and examples thereof are as follows.

According to a first aspect of the present disclosure for solving the above problems, there is provided a distributed system including an edge device that is at least one of an automatically operable moving body and equipment, and a diagnostic data computer, in which the edge device converts state data representing the state of a component that is a constituent of a replaceable unit forming the edge device, into diagnostic data according to a predetermined diagnostic algorithm, and the diagnostic data computer acquires the diagnostic data from a first edge device, and refers to a database regarding the configuration of the edge device, and specifies a second edge device that employs a component related to the component employed in the first edge device.

According to the present disclosure, when an abnormality occurs in a certain edge device, it is possible to specify another edge device that employs the component that is the factor of the abnormality.

The problems, configurations, and effects other than those described above will be clarified from the description of the embodiments below.

BRIEF DESCRIPTION OF THE DRAWINGS

FIG. 7 is a diagram illustrating a display example of a factor analysis result screen provided for an operator of an edge device.

DESCRIPTION OF EMBODIMENTS

Figure 1:
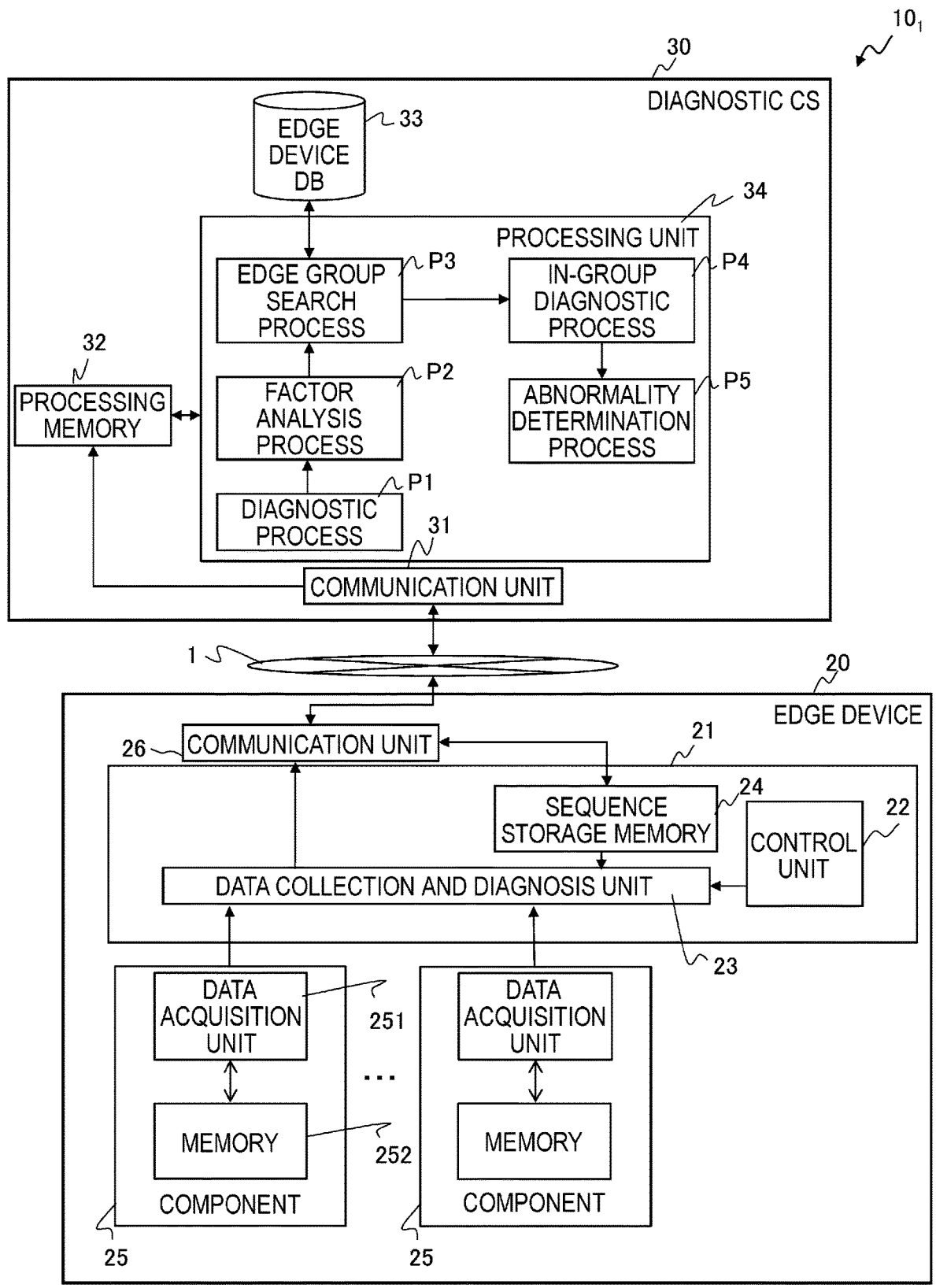
FIG. 1 is a diagram illustrating a configuration example of a distributed system according to a first embodiment of the present disclosure.

In the following embodiments, when it is necessary for the sake of convenience, the description will be made by referring to a plurality of divided sections or embodiments, but unless otherwise specified, these are related to each other, and one is in relation to some or all of the other as modifications, details, supplementary explanations, and the like.

Further, in the following embodiments, when the number of elements (including the number, numerical value, quantity, range, and the like) is mentioned, the number is not limited to the specific number, and may be more than or less than the specific number, except when explicitly stated or when the number is clearly limited to the specific number in principle.

Furthermore, it goes without saying that, in the following embodiments, the constituents (including step elements and the like) are not necessarily essential unless otherwise specified or clearly considered to be essential in principle.

Likewise, in the following embodiments, when the shape, positional relationship, and the like of the constituents, and the like are mentioned, it shall include those that are substantially like or similar to the shape and the like unless it is explicitly stated or clearly considered otherwise in principle, and the like. This also applies to the numerical values and ranges discussed above.

Further, throughout the drawings provided for explaining the embodiments, the same members are denoted by the same reference numerals in principle, and the repeated description thereof will be omitted. Hereinafter, each embodiment of the present disclosure will be described with reference to the drawings.

Configuration Example of a Distributed System $10_1$ According to First Embodiment of the Present Disclosure FIG. 1 illustrates a configuration example of a distributed system $10_1$ according to a first embodiment of the present disclosure.

The distributed system $10_1$ includes an edge device 20 and a diagnostic cloud server (CS) 30. The edge device 20 is connected to the diagnostic cloud server 30 via a network 1. The network 1 is a bidirectional communication network represented by a mobile phone communication network, the Internet (including Ethernet), and the like, for example. While there is only one edge device 20 illustrated in the drawing, in reality, it is assumed that a wide variety of edge devices 20 operated by various service providers are present and are connected to the diagnostic cloud server 30 via the network 1.

It is assumed that the edge device 20 is a moving body (e.g., a vehicle, a drone, a robot) or equipment (e.g., a robot arm, a machine tool, a numerical control lathe, and the like) that can be automatically operated, for example. In this example, it is assumed that the automatic operation includes automatic driving. In this example, the automatic operation refers to an operation by electronic control, and includes not only a fully automatic operation that does not require human control, but also a partial automatic operation involving automatically electronically controlling a part of operating parts, and an automatic operation under limited conditions. Examples of the edge device 20 may include a vehicle capable of automatic driving.

The edge device 20 includes an in-edge controller 21, a plurality of components 25, and a communication unit 26.

For example, the in-edge controller 21 includes a computer such as an Electronic Control Unit (ECU), a Central Processing Unit (CPU), an Application Specific Integrated Circuit (ASIC), and the like. The in-edge controller 21 includes a control unit 22, a data collection and diagnosis unit 23, and a sequence storage memory 24.

The control unit 22 controls the operations of the data collection and diagnosis unit 23 and the component 25. For example, the control unit 22 controls an actuator or the like (not illustrated) included in the component 25 based on the state data collected from the component 25 by the data collection and diagnosis unit 23.

The data collection and diagnosis unit 23 collects state data of sensors, power supplies, actuators, and the like (none is illustrated), which are constituent parts of the component 25, from a memory 252 of each component 25 according to the collection conditions. Further, the data collection and diagnosis unit 23 converts the state data collected from the component 25 into diagnostic data representing the internal state of the in-edge controller 21 according to a predetermined diagnostic algorithm and outputs the result to the communication unit 26. Specifically, for example, the state data is compared with a predetermined threshold value and converted into the diagnostic data based on the comparison result.

The sequence storage memory 24 stores in advance a collection condition including a type, a cycle, a procedure, and the like of the state data to be collected, and a diagnostic algorithm for converting the state data into diagnostic data.

The component 25 is a functional, logical, or physical constituent for realizing various replaceable units such as a moving mechanism, an actuation mechanism, and the like included in the edge device 20. For example, when the edge device 20 is a vehicle, the units include an engine, a motor, a brake, a car navigation system, an ECU, and the like, for example.

The component 25 includes a data acquisition unit 251 and the memory 252.

The data acquisition unit 251 acquires the state data representing the state of the component 25 from registers, log data, and the like in each component 25.

The state data acquired by the data acquisition unit 251 is temporarily stored in the memory 252.

The communication unit 26 assigns identification information of the edge device 20 to the diagnostic data input from the data collection and diagnosis unit 23, and transmits it to the diagnostic cloud server 30 via the network 1. Further, the communication unit 26 receives the collection condition and the diagnostic algorithm transmitted from the diagnostic cloud server 30 via the network 1 and outputs the received condition and algorithm to the control unit 22.

The diagnostic cloud server 30 includes one or more computers present on the network 1. In the present embodiment, one or more locally existing computers may be employed instead of the cloud server such as the diagnostic cloud server 30 and the like. Conversely, the cloud server may be employed instead of the local computer. The diagnostic cloud server 30 corresponds to the diagnostic computer of the present disclosure.

The diagnostic cloud server 30 includes a communication unit 31, a processing memory 32, an edge device database (DB) 33, and a processing unit 34.

The communication unit 31 receives the diagnostic data transmitted from the edge device 20 via the network 1. Further, the communication unit 31 transmits control information to the edge device 20 via the network 1.

The processing memory 32 temporarily stores the diagnostic data of the edge device 20 received by the communication unit 31, various processing results by the processing unit 34, and the like.

Information on the edge device 20 such as, for example, a type of the edge device 20, configuration information of the edge device 20 (type of the component 25 employed in the unit that forms the edge device 20, location of use of the component 25, and the like), a manufacturer of the edge device 20, a service provider operating the edge device 20, a repairer, and the like is stored in the edge device DB 33 in association with each other.

The processing unit 34 executes a diagnostic process P1, a factor analysis process P2, an edge group search process P3, an in-group diagnostic process P4, and an abnormality determination process P5. Each process will be described below.

<Outline of Operation of Distributed System $10_1$>

In the distributed system $10_1$ configured as described above, the data collection and diagnosis unit 23 of the edge device 20 collects state data from the memory 252 of the component 25 according to the collection condition transmitted from the diagnostic cloud server 30 and stored in the sequence storage memory 24 in advance, and converts the state data into diagnostic data according to the diagnostic algorithm. Then, the communication unit 26 transmits the diagnostic data to the diagnostic cloud server 30 via the network 1 according to a predetermined communication protocol.

In the diagnostic cloud server 30, the communication unit 31 receives the diagnostic data transmitted from the edge device 20 and stores the received data in the processing memory 32. Then, in the diagnostic process P1, the processing unit 34 diagnoses the presence or absence of an abnormality or failure in the edge device 20 based on the diagnostic data of the edge device 20 stored in the processing memory 32. The diagnosis result is stored in the processing memory 32 in association with the diagnostic data. Here, the edge device 20 diagnosed for the presence or absence of the abnormality or failure corresponds to the first edge device of the present disclosure.

Next, in the factor analysis process P2, the processing unit 34 analyzes the diagnostic data of the edge device 20 and specifies the component 25 that is the factor of the abnormality or failure. The factor of the abnormality or failure includes a hardware failure of the component 25 and an abnormality in operation by the software. For example, a method for analyzing a failure factor includes creating a database of correlations of the diagnostic data and the component 25 as a factor, and obtaining the failure factor based on the database. As a method of implementing this database, conditions and results may be listed, or machine learning using a neural network may be used. In other words, any method may be used as long as it is a type and method that associate and search the correlation between the diagnostic data and the failure factors within the edge device. As a method for specifying the site where the abnormality or failure occurs, the site may be obtained by using the correlation between the state data and the factor of the abnormality or failure.

Next, in the edge group search process P3, the processing unit 34 refers to the edge device DB 33 and searches for a group of edge devices 20 employing a component related to the component 25 that is the factor of the abnormality or failure. At this time, the component related to the component 25 that is the factor of the abnormality or failure includes OEM products and the like having the same basic design, and different specifications, different versions, for example, in addition to the component that is completely the same as the component 25 that is the factor of the abnormality or failure. Hereinafter, the component 25 that is the factor of the abnormality or failure is referred to as a factor component, and the component related to the factor component is referred to as a related component. In addition to the embodiment described above, the relationship between the factor component and the component may be set by the user.

In this group search, the edge devices 20 employing the related component are grouped from various viewpoints. For example, the edge devices 20 employing the related component and being of the same type are grouped, or the edge devices 20 employing the related component and manufactured by the same manufacturer are grouped, or the edge device 20 employing the related component and operated by the same service provider are grouped, or the edge devices 20 employing the related component and having approximately the same usage environment (area of use, and the like) and usage conditions (e.g., when the edge device is a vehicle, mileage, and the like) are grouped, or the edge devices 20 employing the related component regardless of the manufacturer or service provider, and employing the related component in the same mechanism are grouped, or the edge devices 20 employing the related component and having the same or similar form of connection between the related component and the other component in the edge device 20 are grouped. The type of grouping is not limited to the examples described above. The condition for grouping may be determined by the user.

Next, in the in-group diagnostic process P4, the processing unit 34 diagnoses a degree of relevance between the edge device 20 employing the factor component and the edge device belonging to the same group as the edge device 20, that is, employing the related component. For example, when the factor component and the related component are employed in the same mechanism in each edge device 20, a high degree of relevance is diagnosed, and when they are employed in different mechanisms, a low degree of relevance is diagnosed. An edge device belonging to the same group as the edge device 20 corresponds to the second edge device of the present disclosure.

Next, in the abnormality determination process P5, the processing unit 34 determines the possibility of occurrence of the same abnormality or failure as that of the edge device 20 diagnosed as having an abnormality or failure, based on the diagnostic data of the other edge devices belonging to the same group as the edge device 20 diagnosed as having an abnormality or failure, according to the degree of relevance of each grouped edge device. Specifically, for example, a database of the correlation between the time-series change of diagnostic data and the possibility (probability) of occurrence of the abnormality or failure is generated, and the possibility of occurrence of the abnormality or failure is determined based on that database. As a method of implementing this database, time-series changes and probabilities of state data may be listed, or machine learning using a neural network may be used.

Further, in the abnormality determination process P5, an alert to the other edge devices that belong to the same group as the edge device 20 diagnosed as having an abnormality or failure and that are determined to have the possibility of an abnormality or failure, is output to the manufacturers, repairers, operation companies, and the like of the other edge devices (hereinafter collectively referred to as service providers). The alert to be output may be output by distinguishing emergency, warning, attention, report, and the like according to the probability of occurrence of abnormality or failure. In addition, the frequency of the alert may be arbitrarily set by the user for each edge device, each mechanism, each component, and the like.

As described above, according to the distributed system 10₁, the edge device 20 and the external diagnostic cloud server 30 of the edge device 20 may cooperate with each other to diagnose an abnormality or failure occurring in the edge device 20 and specify a factor component. In addition, a group of edge devices employing the related component to the factor component can be searched, and among the other edge devices belonging to the group, the possibility of occurrence of the same abnormality or failure as that of the edge device 20 diagnosed as having an abnormality or failure can be diagnosed, and an alert according to the diagnosis result can be output to service providers or the like related to the other edge devices. As a result, the service providers or the like can perform maintenance of the edge devices before the abnormality or failure actually occurs, and can avoid the abnormality or failure of the edge devices, so that it is possible to improve the operating rate of the edge devices.

Application Example of Distributed System 10₁

Figure 2:
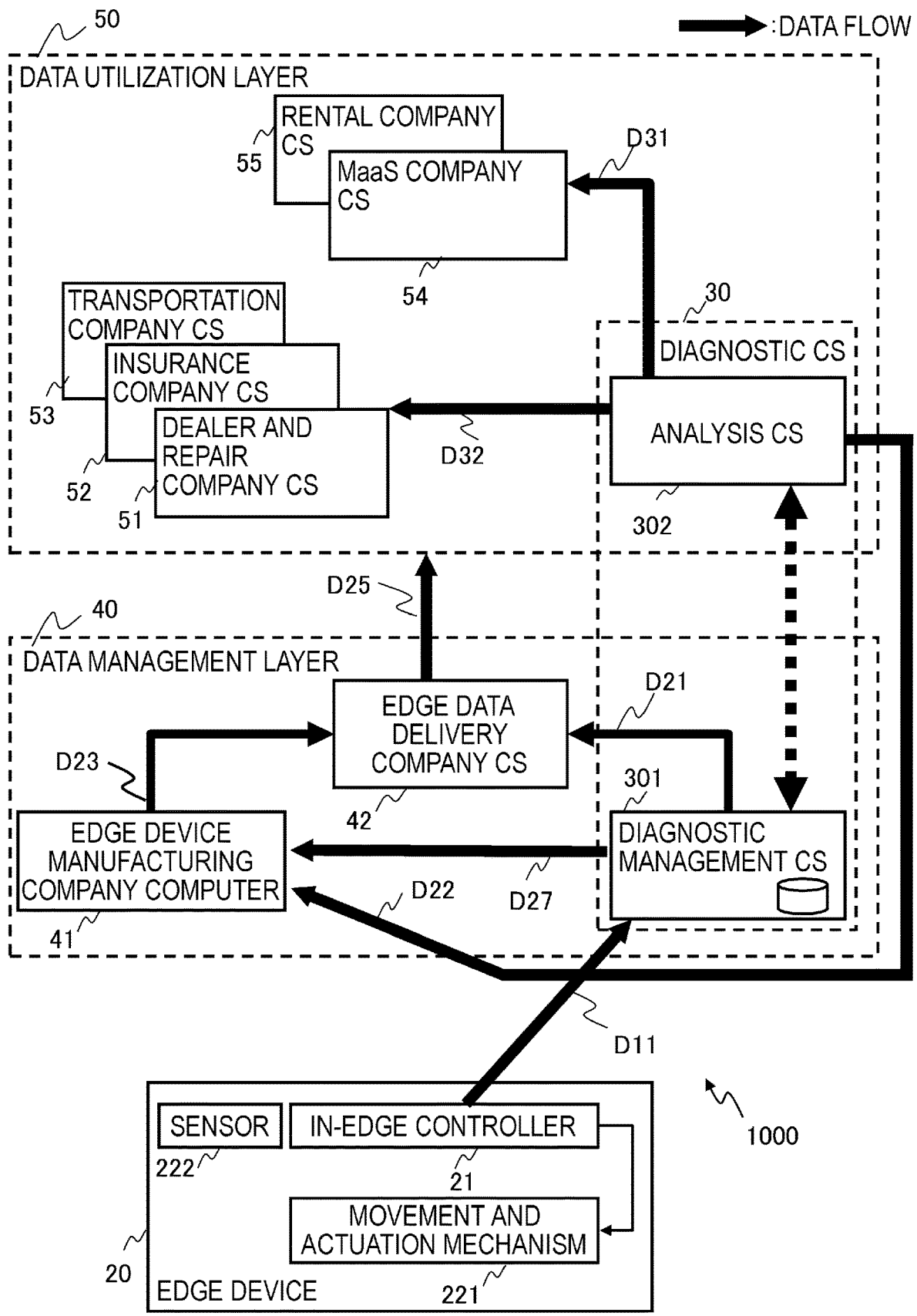
FIG. 2 is a diagram illustrating an application example of a distributed system.

Next, FIG. 2 illustrates the flow of data in the distributed system 1000, which is an application example of the distributed system 10₁ illustrated in FIG. 1.

The distributed system 1000 is multi-layered, and includes one or more edge devices 20, one or more cloud servers (or computers) included in a data management layer 40, and one or more cloud servers (or computers) included in a data utilization layer 50.

In the distributed system 1000, the diagnostic cloud server 30 of FIG. 1 is divided into a diagnostic management cloud server 301 and an analysis outsourcing cloud server 302. The diagnostic management cloud server 301 is arranged in the data management layer 40, and the analysis outsourcing cloud server 302 is arranged in the data utilization layer 50.

The edge device 20 includes the in-edge controller 21, a moving and actuation mechanism 221, and a sensor 222.

For example, the in-edge controller 21 includes an ECU or the like, and controls the moving and actuation mechanism 221. The moving and actuation mechanism 221 is at least one of the moving mechanism and the actuation mechanism. For example, the moving mechanism is an engine, a motor, and the like in the moving body. For example, the actuation mechanism is an actuator such as a motor, hydraulic pressure, and the like in the equipment. The moving and actuation mechanism 221 corresponds to a unit formed of the component 25 (FIG. 1).

In relation to the moving and actuation mechanism 221, "activation" at least means that "by performing a certain operation, a device changes its state according to the operation command (JIS B 0132 compliant)".

In the following description, for the sake of simplicity of the description, a situation where the edge device 20 is a moving body and the moving and actuation mechanism 221 is a moving mechanism will be described as an example. Further, the in-edge controller 21 is abbreviated as ECTL (Edge Controller) 21.

The ECTL 21 is in charge of at least a part of process for realizing the automatic operation of the edge device 20. Therefore, the ECTL 21 is becoming more complicated from the viewpoint of hardware or software. For example, examples of hardware complexity may include Graphics Processing Unit (GPU), Field-Programmable Gate Array (FPGA), neural network dedicated processor, and other hardware that accelerates machine learning, for introducing machine learning process and introducing process of recognizing and determining data inputs from various sensors and cameras in real time.

The data management layer 40 is a virtual layer or group introduced to simplify the explanation. The cloud server (or computer) included in the data management layer 40 is mainly used for storing the data generated by the edge device 20.

Note that the data management layer 40 may include a cloud server (or a computer) for purposes other than those described above. Further, the cloud server (or computer) for the purposes described above may be omitted from the data management layer 40.

In the case of the drawing, the data management layer 40 includes an edge device manufacturing company computer 41, an edge data distribution company cloud server (CS) 42, and a diagnostic management cloud server (CS) 301.

The edge device manufacturing company computer 41 is a computer owned by a company that designs or manufactures the edge device 20. Since the manufacturing company manages edge data related to the edge device 20 for the development and maintenance of its own products, it is included in the data management layer 40 for convenience. The edge device manufacturing company computer 41 transmits edge data update data D23 to the edge data distribution company cloud server 42.

The edge data distribution company cloud server 42 stores the edge data related to the edge device 20, and, in response to a request from another cloud server, transmits unprocessed or processed edge data D25 to the cloud server that is a source of request. The edge data D25 is assumed to be information on constituent parts of the edge device 20 and the like, for example.

Here, processing of data includes change of data representation format, calculation of difference values, calculation of statistical values, encryption, decryption, compression, decompression, removal of unnecessary data, addition or removal of redundant codes, data extraction, and the like, for example, but when a processing entity modifies and transmits a part or all of the received data, this may be regarded as processing.

The diagnostic management cloud server 301 stores diagnostic data D11 (hereinafter, also referred to as in-edge controller diagnostic data and ECTL diagnostic data), and transmits unprocessed or processed diagnostic data D21 and D27 in response to a request from another cloud server. In addition, the ECTL diagnostic data is an example of the edge data.

From one point of view, a company that includes a cloud server (or computer) included in the data management layer 40 may be regarded as a company that designs and manufactures the edge device 20 and its parts, or a company that is in charge of distributing edge data. From this point of view, the cloud servers of the communication companies, companies providing car navigation programs executed by smartphones, and manufacturing companies of the moving mechanisms may be regarded as being included in the data management layer 40.

The data utilization layer 50 is a virtual layer or group introduced to simplify the explanation. The cloud server (or computer) included in the data utilization layer 50 is used for purposes closer to the service provision than the cloud server included in the data management layer 40.

It is assumed that the service provided by the cloud server included in the data utilization layer 50 is an edge device-related service that uses the edge device 20, or targets an entity related to the edge device 20, or targets the edge device 20 itself.

In this case, it is assumed that the entity is a collection or group of human beings, an animal, or a device (a traffic light, a ship carrying the edge device 20, a device that supports the automatic operation of the edge device 20 outside the edge device 20), for example.

In the case of the drawing, the data utilization layer 50 includes cloud servers of various service providers including a dealer and repair company cloud server (CS) 51, an insurance company cloud server (CS) 52, a transportation company cloud server (CS) 53, a MaaS company cloud server (CS) 54, a rental company cloud server (CS) 55, an analysis outsourcing cloud server (CS) 302, and the like.

The dealer and repair company cloud server 51 receives edge data D25 or post-analysis data D32 provided from the analysis outsourcing cloud server 302, generates information necessary for maintenance service (failure prevention, repair, and the like) or repair service (accident response), and presents the generated result to the user, so as to support the work of dealers and repair companies that arrange repairs and maintenance of the edge device 20 and repair the edge device 20.

The insurance company cloud server 52 performs some or all processes for determining the insurance premium rate with reference to the edge data D25 or the post-analysis data D32 provided by the analysis outsourcing cloud server 302, at an insurance company that takes on predetermined risks related to the business of a company that performs a predetermined function by using the edge device 20. In addition, the risk taken by the insurance company may be a risk related to the entity that uses the edge device 20. For example, it is assumed to be an automobile insurance and the like contracted by an individual.

The transportation company cloud server 53 executes a process for providing a transportation service based on the edge data D25 or the post-analysis data D32 provided from the analysis outsourcing cloud server 302, at a transportation company that operates the transportation business by using the edge device 20 directly or by using the services of another transportation company. As an example of the process, it is assumed to be the vehicle allocation plan of the edge device 20, the calculation of the fare, the analysis process for the revision of the service specification including the fare, and the like.

The MaaS (Mobility as a Service) company cloud server 54 receives the edge data D25 or post-analysis data D31 provided from the analysis outsourcing cloud server 302, and generates information necessary for maintenance planning of the owned vehicle and the like, so as to support the business of a MaaS company that operates the services of providing transportation means by using the edge device 20 directly or using services of other companies. The information is provided to employees of the MaaS company and the like.

Like the MaaS company cloud server 54, the rental company cloud server 55 receives the edge data D25 or the post-analysis data D31 provided from the analysis outsourcing cloud server 302, and generates information necessary for the maintenance plan of the owned vehicle and the like, so as to support the business of a rental company that operates the services of providing transportation means by using the edge device 20 directly or using services of other companies. The information is provided to employees of the rental company and the like.

The analysis outsourcing cloud server 302 is a cloud server that the company included in the data utilization layer 50 outsources a service-related analysis process necessary for providing or improving the service. The analysis outsourcing cloud server 302 is in charge of outsourcing the analysis of the state data and the diagnostic data D11 (particularly ECTL diagnostic data), but can also be in charge of outsourcing the analysis of the edge device manufacturing company and the like included in the data management layer 40. The service-related analysis process by the analysis outsourcing cloud server 302 corresponds to the factor analysis process related to the internal state of the edge device 20 or the ECTL 21 in each solution described below.

The method of dividing the data management layer 40 and the data utilization layer 50 is not limited to the example illustrated in the drawing, and may not be exclusive. For example, the cloud server of the communication company corresponds to the edge data distribution company cloud server 42 included in the data management layer 40 from the viewpoint of the edge data distribution described above, but is considered to be included in the data utilization layer 50 from the viewpoint of providing the "communication service" to the edge device 20.

Further, from another viewpoint, a company having a cloud server included in the data utilization layer 50 may be regarded as a company that does not design or manufacture the edge device 20 or its parts.

Configuration Example of Computer 100 Forming Cloud Server

Figure 3:
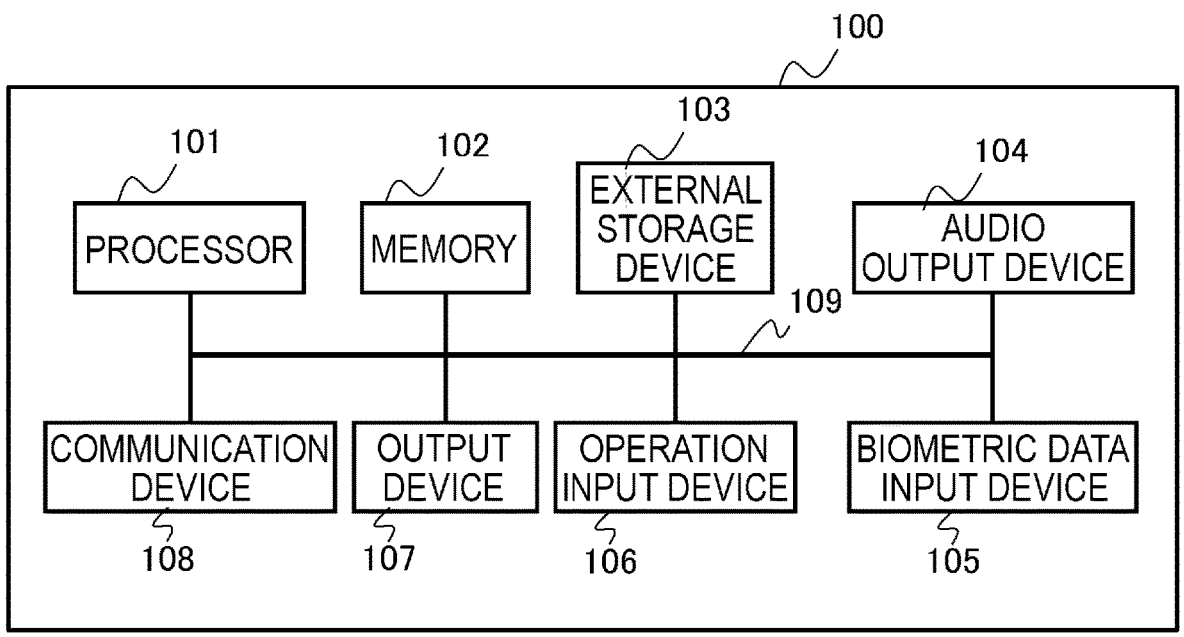
FIG. 3 is a diagram illustrating an example of a hardware configuration of a computer.

Next, FIG. 3 illustrates an example of the hardware configuration of the computer 100 forming a cloud server such as the diagnostic cloud server 30 and the like.

The computer 100 is configured by connecting a processor 101, a memory 102, an external storage device 103, an audio output device 104, a biometric information input device 105, an operation input device 106, an output device 107, and a communication device 108 via a data bus 109.

The processor 101 includes a CPU, a GPU, an FPGA, and the like, and controls the entire computer 100. The memory 102 is a main storage device such as a Random Access Memory (RAM) and the like. The external storage device 103 is a non-volatile storage device such as a Hard Disk Drive (HDD), Solid State Drive (SSD), flash memory, and the like that can store digital information.

The audio output device 104 includes a speaker and the like. The biometric information input device 105 includes a camera, a line-of-sight input device, a microphone, and the like. The operation input device 106 includes a keyboard, a mouse, a touch panel, and the like. The output device 107 includes a display, a printer, and the like.

The communication device 108 includes a Network Interface Card (NIC), and the like. The communication device 108 communicates with the other devices connected to the same network by at least one of wired communication and wireless communication. Packet communication by Transmission Control Protocol/Internet Protocol (TCP/IP) is employed for the communication, but not limited thereto, and communication by other protocols such as User Datagram Protocol (UDP) and the like may be employed.

The hardware configuration of the computer 100 is not limited to the example described above, and some of the constituents described above may be omitted or other constituents may be further included. Further, the computer 100 may be various information processing devices such as a server computer, a personal computer, a notebook computer, a tablet computer, a smartphone, a television device, and the like.

The computer 100 may store programs such as an operating system (OS), middleware, application programs, and the like, read the programs from the outside, and execute various processes by executing these programs by the processor 101.

Figure 4:
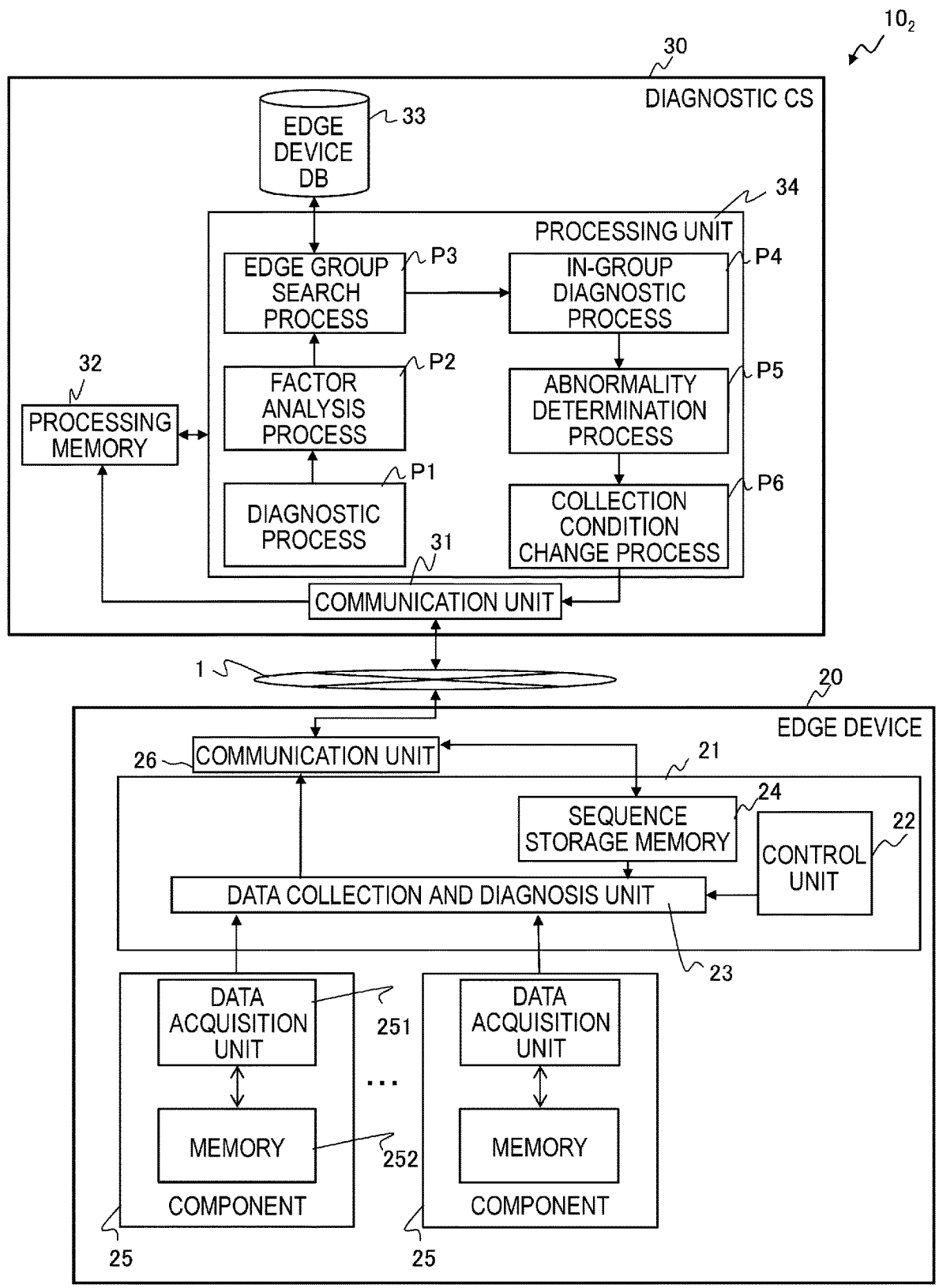
FIG. 4 is a diagram illustrating a configuration example of a distributed system according to a second embodiment of the present disclosure.

Configuration Example of Distributed System $10_2$ According to Second Embodiment of Present Disclosure FIG. 4 illustrates a configuration example of a distributed system $10_2$ according to a second embodiment of the present disclosure.

The distributed system $10_2$ corresponds to adding a collection condition change process P6 to the process executed by the processing unit 34 of the diagnostic cloud server 30 with respect to the distributed system $10_1$.

In the collection condition change process P6, the collection condition (type of state data to be collected, cycle, procedure, and the like) for collecting the state data of the edge device that is determined by the abnormality determination process P5 as having a possibility that an abnormality or failure may occur and converting into diagnostic data and transmitting the same to the diagnostic cloud server 30 can be changed.

As a result, it is possible to check an abnormality or failure in another edge device belonging to the same group as the edge device 20 diagnosed as having an abnormality or failure at an early stage.

For example, since the electronic device as the component 25 is prone to error at high temperatures, it is designed to acquire the position information to enable the other edge devices 20 determine the usage environment (area of use), and is instructed to change so that the diagnostic data collection cycle is shortened when traveling in warm climates in the summer.

Further, for example, it is instructed to change so that, as the state data, a value of a status register or the like, which is not read in the steady state when no abnormality or failure is diagnosed, and transmit the read result as it is as the diagnostic data.

In addition, for example, in response to a problem that cable deterioration is likely to occur inside the component 25, it is instructed to change so that the number of communication errors inside the component 25, which are not monitored during steady state, are transmitted as the diagnostic data.

In addition, the processing unit 34 of the diagnostic cloud server 30 can instruct to restore the collection condition that is instructed to change in the collection condition change process P6 back to the collection condition before the change, in response to a predetermined trigger (e.g., operation from the user or determination by the processing unit 34). As a result, it is possible to prevent the edge device 20 from being overloaded due to changes in the collection condition and having any trouble in normal operation.

According to the distributed system $10_2$ described above, while having the same actions and effects as those of the distributed system $10_1$, the system can additionally change the collection condition, so as to diagnose with higher accuracy the possibility that an abnormality or failure will occur in another edge device belonging to the same group as the edge device 20 diagnosed as having an abnormality or failure. Accordingly, by performing maintenance before an abnormality or failure occurs, it is possible to improve the operating rate of the edge device and reduce the maintenance cost.

Figure 5:
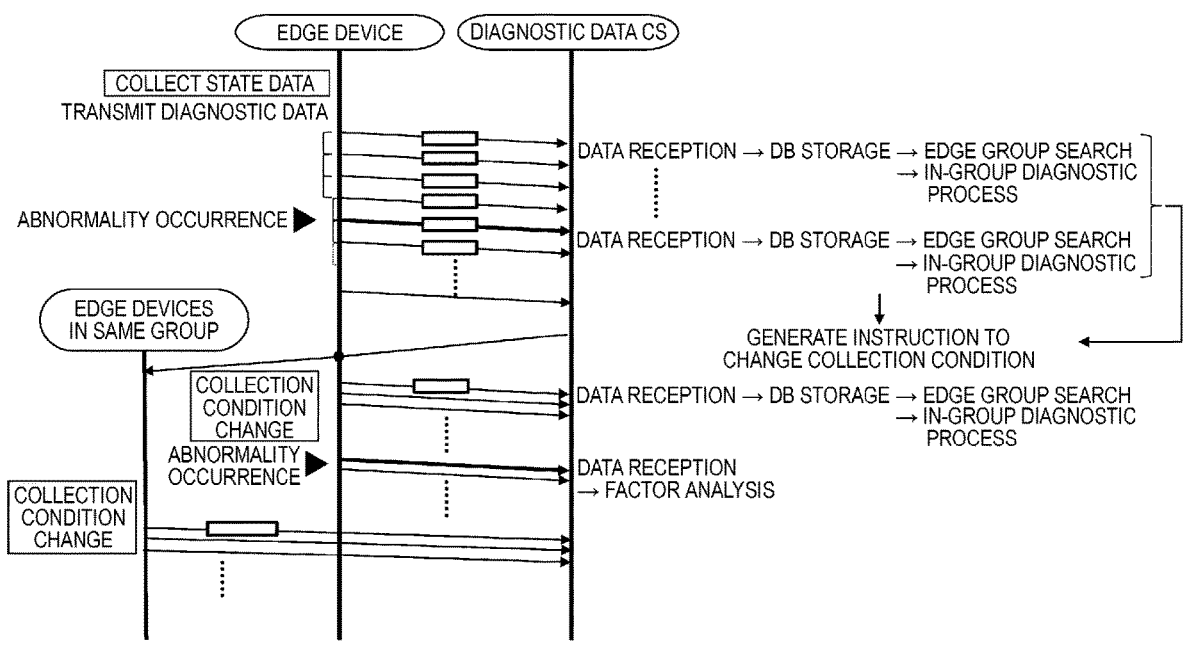
FIG. 5 is a diagram illustrating an example of a transmission and reception protocol of state data.

Next, FIG. 5 illustrates an example of a transmission and reception protocol between the edge device 20 and the diagnostic cloud server 30 in the distributed system $10_2$.

In the edge device 20, the data collection and diagnosis unit 23 of the in-edge controller 21 periodically collects the state data from the component 25 and converts the collected data into the diagnostic data at a predetermined cycle, and the communication unit 26 transmits the diagnostic data to the diagnostic cloud server 30.

Next, in the diagnostic cloud server 30, the received diagnostic data is stored in the processing memory 32, and the diagnostic process P1, the factor analysis process P2, the edge group search process P3, the in-group diagnostic process P4, and the abnormality determination process P5 are executed based on the diagnostic data. Then, in the collection condition change process P6, an instruction to change the collection condition (e.g., an instruction to shorten the collection cycle of state data) in the edge device diagnosed as having a possibility that an abnormality or failure may occur is generated and transmitted to the corresponding edge device.

Then, the edge device receiving the instruction to change the collection conditions subsequently collects the state data from the component 25 and converts the collected data into the diagnostic data according to the changed collection condition, and the communication unit 26 transmits the diagnostic data to the diagnostic cloud server 30.

Then, the diagnostic cloud server 30 executes the diagnostic process P1, the factor analysis process P2, the edge group search process P3, the in-group diagnostic process P4, and the abnormality determination process P5 based on the diagnostic data collected and transmitted according to the changed collection condition.

As can be seen from FIG. 5, when a certain edge device 20 is diagnosed as having an abnormality or failure, the collection condition can be changed for the edge devices belonging to the same group as the certain edge device. As a result, it is possible to quickly and accurately check an abnormality or failure in another edge device belonging to the same group as the edge device 20 diagnosed as having an abnormality or failure.

<Display Example of Factor Analysis Result Screen>

Figure 6:
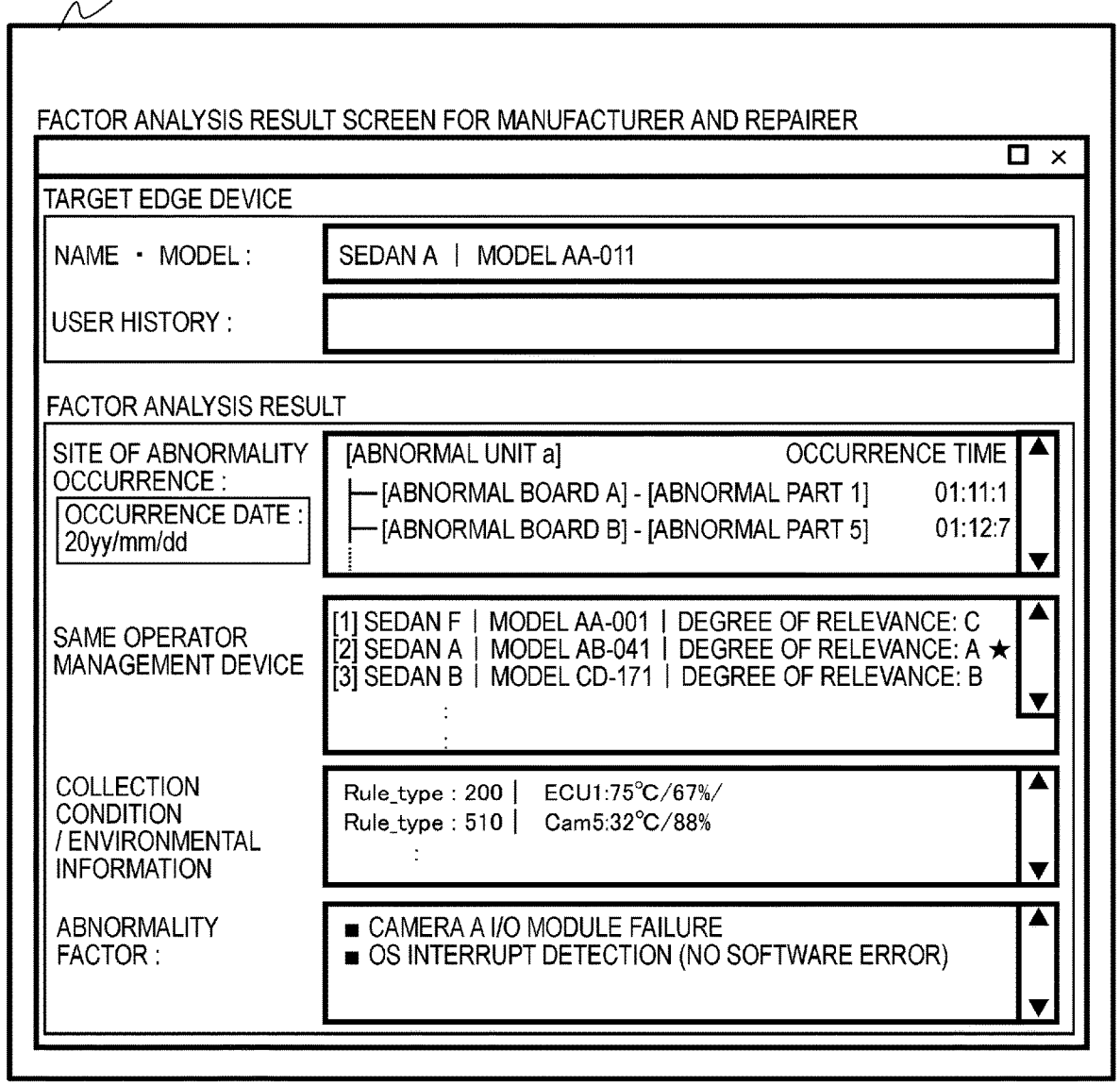
FIG. 6 is a diagram illustrating a display example of a factor analysis result screen provided for an edge device manufacturer and repairer.

Next, FIG. 6 illustrates a display example of a factor analysis result screen 500 for manufacturer and repairer, which is displayed on the edge device manufacturing company computer 41, the dealer and repair company cloud server 51 (both in FIG. 2), and the like. The screen information of the factor analysis result screen 500 is generated by the processing unit 34 and displayed on the screen of the edge device manufacturing company computer 41 or the like connected to the diagnostic cloud server 30.

On the factor analysis result screen 500, name and model of the edge device 20 diagnosed as having an abnormality or failure by the diagnostic cloud server 30, a user history, and a factor analysis result are displayed.

The factor analysis result includes items such as a site of abnormality occurrence, a device managed by the same operator, collection condition and environmental information, and an abnormality factor.

The item "site of abnormality occurrence" displays a name, an occurrence date, and an occurrence time of the factor component in the edge device 20 diagnosed as having an abnormality or failure.

The item "device managed by the same operator" displays names, models, and degrees of relevance of other edge devices that are managed by the same operator operating the edge device 20 diagnosed as having an abnormality or failure and that use the related component of the factor component.

The item "collection condition and environmental information" displays a rule type, a temperature, and a humidity that represent the collection condition of the state data.

The item "abnormality factor" displays a specific abnormality factor in the factor component. The abnormality factor also includes information for determining whether it is a software abnormality or a hardware abnormality. This is because the method of resolving a software abnormality and a hardware abnormality differ greatly in many cases.

The manufacturer or repairer of the edge device 20 can confirm the edge device 20 in which the abnormality or failure is occurred and the factor component that is the factor of the abnormality or failure by checking the factor analysis result screen 500. Furthermore, it is possible to confirm the names, models, and the degrees of relevance of the other edge devices employing the related component of the factor component. Therefore, the manufacturer of the edge device 20 can review the basic design of the factor component and the related component, or consider replacing it with another component, for example. For example, the repairer of the edge device 20 can prepare a replacement for a factor component or a related component in preparation for a repair that may be requested in the future.

Next, FIG. 7 illustrates a display example of a factor analysis result screen 600 for operators operating the edge device 20, which is displayed on the transportation company cloud server 53, the MaaS company cloud server 54, the rental company cloud server 55 (all in FIG. 2), and the like. The screen information of the factor analysis result screen 600 is generated by the processing unit 34, and displayed on the screen of the transportation company cloud server 53 or the like connected to the diagnostic cloud server 30.

Like the factor analysis result screen 500 (FIG. 5), on the factor analysis result screen 600, the name and model of the edge device 20 diagnosed as having an abnormality or failure by the diagnostic cloud server 30, the user history, and the factor analysis result are displayed.

The factor analysis results include items such as a site of abnormality occurrence, a point of abnormality occurrence, an abnormality response urgency, an in-group device in need of response, a response content, and an abnormality factor and abnormality occurrence history.

The item "site of abnormality occurrence" displays a name, an occurrence date, and an occurrence time of the factor component in the edge device 20 diagnosed as having an abnormality or failure. The item "point of abnormality occurrence" displays an address, a latitude, and a longitude indicating the point where the abnormality or failure is occurred.

The item "abnormality response urgency" displays in highlighting an immediate replacement and repair required, a response required after return, or a response at the time of regular maintenance.

The item "in-group device in need of response" displays a name, model, and a degree of relevance of the edge device 20 that needs to be repaired among the edge devices 20 operated by the operation company.

The item "response content" displays a specific content of response such as repairs and the like. The item "abnormality factor and abnormality occurrence history" displays a specific abnormality factor in the factor component and the history of abnormality occurrence in the factor component.

The operator of the edge device 20 can confirm the edge device 20 in which an abnormality or failure is occurred and the component 25 that is the factor of the abnormality or failure by checking the factor analysis result screen 600. Furthermore, it is possible to confirm the urgency of the abnormality response and repair costs.

As a result, the operator of the edge device 20 can select the following countermeasures.

Countermeasure 1: The repair work is performed with priority given to the edge device 20 in which the point of abnormality occurrence is far from the base position of the operator. An example of reflecting the priority is an arrangement of an alternative edge device 20.

Countermeasure 2: An abnormal state with low urgency is resolved before it becomes an abnormal state with high urgency. For example, when the edge device 20 is in an abnormal state that is not fatal by itself, the priority can be lowered, but when the highly correlated abnormal state has a high urgency, the former abnormal state is set to medium or high, which is higher than low.

Countermeasure 3: Repair work is prioritized based on urgency. In particular, when abnormal states having different urgencies occur in the same edge device 20, resolving an abnormal state with a high urgency may also resolve an abnormal state with a lower urgency.

Next, an example where this solution is applied to an insurance company will be described.

As for the insurance contract conditions, even when the insurance premium is low, if the conditions for payment of insurance claims are strict, the contract entity will not complete the contract. Meanwhile, when the conditions for payment of insurance claims are relaxed too much, the income and expenditure of the insurance company will deteriorate too much and the service cannot be continued. Therefore, by referring to the processed data provided by the analysis outsourcing cloud server 302, it is possible to set the conditions for payment of insurance claims in consideration of the frequency of occurrence of the abnormal state inside the edge device 20.

For example, when it is found that the frequency of occurrence of abnormal states inside the edge device 20 increases under specific conditions (e.g., type, usage environment, type of usage entity of edge device 20), the insurance premium is increased under the relevant conditions, and conversely, the insurance premium is lowered under the conditions where the frequency of occurrence is low, so that it is possible to optimize insurance premiums.

Further, by monitoring the state of the edge device 20, it is possible to deal with the dysfunction before it occurs, and increase the probability of preventing the opportunity loss due to an accident or failure. In that case, the payment of insurance claims can be reduced and the insurance premium rate can be lowered. This merit is a greater merit when the abnormalities associated with the edge device 20 increase due to the distribution of automatic operations.

The technique according to the present disclosure is not limited to the distributed system and the data transmission method, and can be provided in various forms such as a computer, a computer-readable program, and the like.

The present disclosure is not limited to the embodiments described above, but various modifications are possible. For example, the embodiments described above are described in detail in order to explain the present disclosure in an easy-to-understand manner, and are not necessarily limited to those having all the configurations described above. Further, it is possible to replace or add a part of the configuration of one embodiment with the configuration of another embodiment.

Each of the configurations, functions, processing units, processing means, and the like described above may be realized by hardware by designing a part or all of those with, for example, an integrated circuit. Each of the configurations, functions, and the like described above may be realized by software by interpreting and executing a program that realizes each function by the processor. Information such as a program, a table, a file, and the like that realizes each function may be stored in a storage device such as a memory, a hard disk, a solid state drive (SSD), or a recording medium such as an IC card, an SD card, and a DVD. Further, the control lines and the information lines show those considered to be necessary for explanation, and it is not necessarily limited that all the control lines and information lines are shown on the product. In practice, it may be considered that almost all the components are connected to each other.

What is claimed is:
1. A distributed system comprising:
a plurality of edge devices which are each at least one of an automatically operable moving body and an automatically operable equipment, wherein the plurality of edge devices convert state data representing states of components that are each a constituent of a replaceable unit forming the edge device, into diagnostic data according to a predetermined diagnostic algorithm; and a diagnostic data computer which acquires first diagnostic data from a first edge device, refers to a database regarding a configuration of the first edge device including a first component of the first edge device, and specifies a second edge device that employs a second component related to the first component of the first edge device, wherein the diagnostic data computer determines a degree of relevance between the first edge device and the second edge device and determines a possibility of occurrence of at least one of an abnormality and a failure in the second edge device based on the degree of relevance and the diagnostic data acquired from the second edge device, and wherein the diagnostic data computer instructs the second edge device having a possibility of occurrence of at least one of the abnormality and the failure to change a collection condition for collecting the state data of the second component and transmit second diagnostic data from the second edge device.

2. The distributed system according to claim 1, wherein the diagnostic data computer diagnoses at least one of an abnormality and a failure in the first edge device based on the diagnostic data acquired from the first edge device, specifies a factor component that is a factor of at least one of the abnormality or the failure of the first edge device based on the diagnostic data acquired from the first edge device, and specifies a group of the second edge devices that employ a related component related to the factor component.

3. The distributed system according to claim 1, wherein the diagnostic data computer instructs the second edge device, which is instructed to change the collection condition, to restore the collection condition.

4. The distributed system according to claim 1, wherein the diagnostic data computer outputs an alert to a service operator regarding the second edge device having the possibility of occurrence of at least one of the abnormality and the failure.

5. The distributed system according to claim 1, wherein the diagnostic data computer transmits the predetermined diagnostic algorithm to the edge device.

6. A data processing method using a distributed system including a plurality of edge devices which are each at least one of an automatically operable moving body and an automatically operable equipment, and a diagnostic data computer, comprising the steps of:

converting, by the plurality of edge devices, state data representing states of components that are each a constituent of a replaceable unit forming the edge device, into diagnostic data according to a predetermined diagnostic algorithm;

acquiring, by the diagnostic data computer, first diagnostic data from a first edge device, referring, by the diagnostic data computer, to a database regarding a configuration of the first edge device including a first component of the first edge device, and specifying, by the diagnostic data computer, a second edge device that employs a second component related to the first component of in the first edge device;

determining, by the diagnostic data computer, a degree of relevance between the first edge device and the second edge device and a possibility of occurrence of at least one of an abnormality and a failure in the second edge device based on the degree of relevance and the diagnostic data acquired from the second edge device; and instructing, by the diagnostic data computer, the second edge device having a possibility of occurrence of at least one of the abnormality and the failure to change a collection condition for collecting the state data of the second component and transmit second diagnostic data from the second edge device.

* * * * *